(12) United States Patent
Chen et al.

(10) Patent No.: US 8,466,692 B2
(45) Date of Patent: Jun. 18, 2013

(54) ELECTROMAGNETIC SENSOR SYSTEM AND ANTENNA LOOP LAYOUT METHOD THEREOF

(75) Inventors: Chin-Yen Chen, Hsin-Chu (TW); Po-Chieh Chuang, Tainan (TW)

(73) Assignee: Waltop International Corporation, Hsinchu (TW)

( * ) Notice: Subject to any disclaimer, the term of this patent is extended or adjusted under 35 U.S.C. 154(b) by 305 days.

(21) Appl. No.: 13/096,694

(22) Filed: Apr. 28, 2011

(65) Prior Publication Data
US 2012/0274339 A1 Nov. 1, 2012

(51) Int. Cl.
*G01R 27/04* (2006.01)

(52) U.S. Cl.
USPC ............................................. 324/629; 324/632

(58) Field of Classification Search
USPC .......................................................... 324/629
See application file for complete search history.

*Primary Examiner* — Thomas Valone
(74) *Attorney, Agent, or Firm* — Huffman Law Group, P.C.

(57) ABSTRACT

An antenna loop layout method for an electromagnetic sensor board is provided. The electromagnetic sensor board has a plurality of inductive antennas which are arranged abreast of each other. One end of the inductive antennas is coupled to each other, and the other end of the inductive antennas have a switch. The method comprises the following steps: first, a pre-determined interval value is provided. Then, the switches are closed in sequence by the pre-determined interval value to form a plurality of physical antenna loops. The pre-determined interval value can be changed dynamically.

11 Claims, 6 Drawing Sheets

ELECTROMAGNETIC SENSOR SYSTEM AND ANTENNA LOOP LAYOUT METHOD THEREOF

BACKGROUND OF THE INVENTION

1. Field of the Invention

The present invention generally relates to an electromagnetic sensor system, and more particularly to an electromagnetic sensor system and antenna loop layout method thereof.

2. Description of Related Art

Conventional electromagnetic sensitive input devices usually include an electromagnetic pointer and a digitizer tablet (or tablet). The electromagnetic pointer has an oscillation circuit, where the inductance value may be changed when the electromagnetic pointer approaches the digitizer tablet. The digitizer tablet calculates the position or the pressure of the electromagnetic pointer according to the electromagnetic signal sensed therefrom.

The center writing region of the conventional digitizer tablet is composed of inductive loops. Taking the X-direction along the two-dimension orthogonal coordinates for example, as shown in FIG. 1, the antenna loop layout 1 includes a plurality of physical antenna loops, and the distance of two ends of each physical antenna loop is fixed. Accordingly, the antenna loop layout can not be adjusted. Furthermore, traditional physical antenna loops are interlaced each other, which requires multiple layers and the complex manufacture. And as the distance between adjacent loops decreases, the manufacturing error rate and production cost increases.

In view of the foregoing, a need has arisen for an antenna loop layout to overcome the above drawback.

SUMMARY OF THE INVENTION

In view of the foregoing, it is an object of the present invention to provide an electromagnetic sensor system and antenna loop layout method to simplify antenna loop manufacture and to allow for dynamic adjustment of the antenna loop layout.

According to one embodiment, an electromagnetic sensor system is provided. The electromagnetic sensor system includes a plurality of inductive antennas, a first signal-in end, a second signal-in end, and a control unit. The inductive antennas are arranged side by side, just like railings, and are equidistant. One end of each inductive antenna is coupled with each other, and the other end of each inductive antenna comprises a switch, respectively. The first signal-in end is coupled with all switches, and the second signal-in end is coupled with all the switches. The control unit, which is coupled to the first signal-in end and the second signal-in end, is configured to control the switches, which are coupled to the first signal-in end and the second signal-in end, to be closed in sequence by a pre-determined interval value to form a plurality of physical antenna loops, wherein, the pre-determined interval value can be changed dynamically.

According to another embodiment, an antenna loop layout method for an electromagnetic sensor board is provided. The electromagnetic sensor board has a plurality of inductive antennas arranged side by side. One end of the inductive antennas are coupled to each other, and the other end of the inductive antennas include a switch. The method comprises the following steps: first, a pre-determined interval value is provided. Then, the switches are closed in sequence by the pre-determined interval value to form a plurality of physical antenna loops, wherein the pre-determined interval value can be changed dynamically.

DETAILED DESCRIPTION OF THE INVENTION

Figure 1:
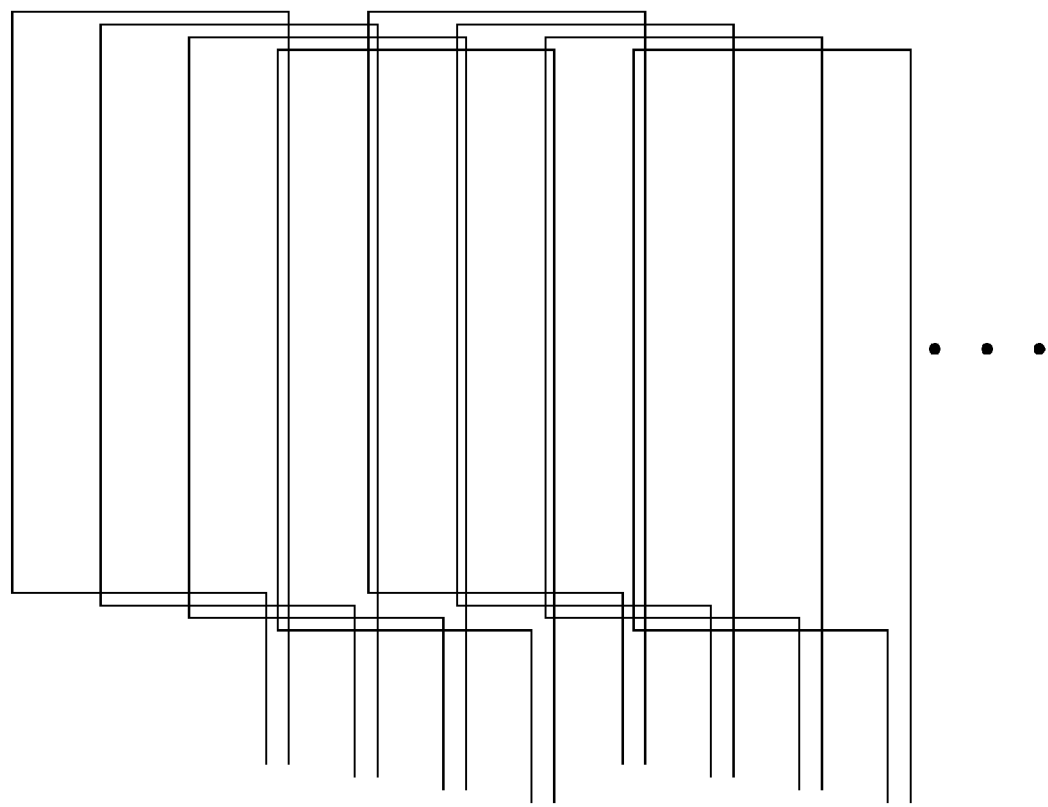
FIG. 1 shows a schematic diagram illustrating a traditional antenna loop layout.
Figure 2:
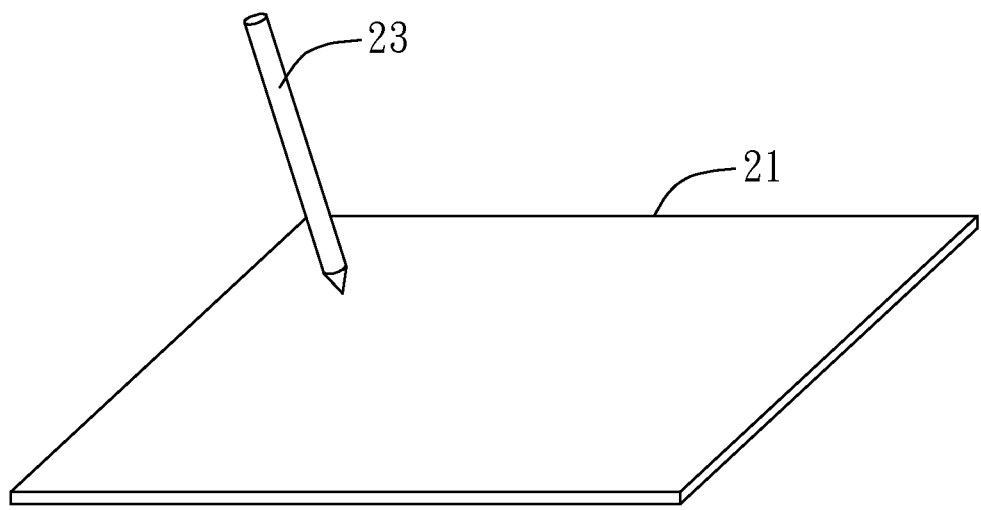
FIG. 2 shows a schematic diagram illustrating an electromagnetic sensor system according to one embodiment of the present invention.

First, please refer to FIG. 2, which shows a schematic diagram illustrating an electromagnetic sensor system according to one embodiment of the present invention. The electromagnetic sensor system 2 includes an electromagnetic sensitive panel 21 and at least one pointing device 23. An antenna loop layer, which is in the bottom of the electromagnetic sensitive panel 21, is disposed to sense the electromagnetic signal emitted by the pointing device 23 to calculate the position or the pressure of each pointing device 23. In one embodiment, the electromagnetic sensitive panel 21 comprises a digitizer tablet and the pointing device 23 comprises an electromagnetic pen. Other embodiments are contemplated.

Figure 3:
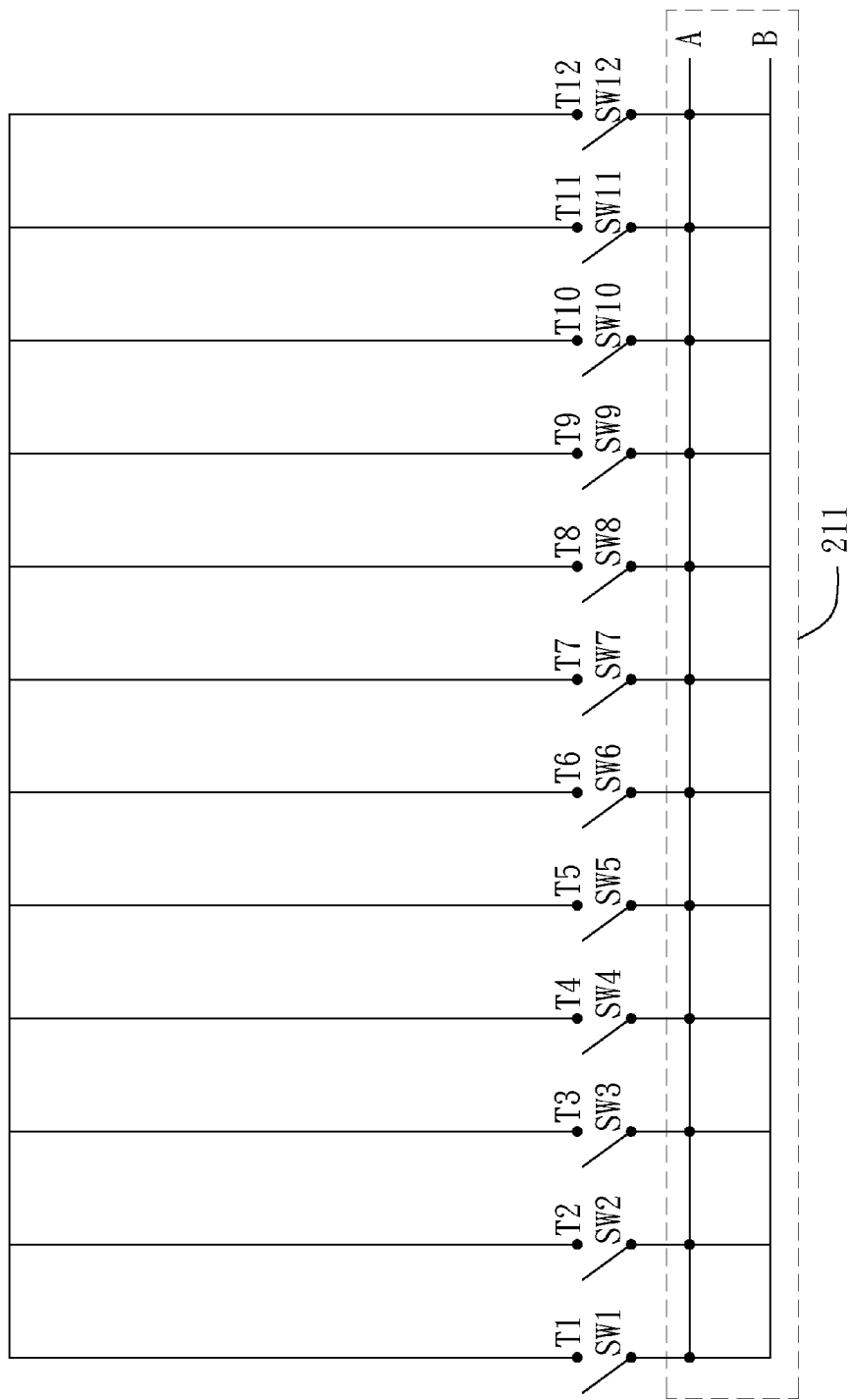
FIG. 3 shows a schematic diagram illustrating an antenna loop layout according to one embodiment of the present invention.

Refer to FIG. 3, which shows a schematic diagram illustrating an antenna loop layout according to one embodiment of the present invention. The antenna loop layer, which is in the bottom of the electromagnetic sensitive panel 21, comprises twelve inductive antennas T1-T12 which are arranged side by side, like railings, and are equidistant. One end of each inductive antenna T1-T12 is coupled with each other, and the other end of each inductive antenna T1-T12 comprises a switch SW1-SW12, respectively. The switches SW1-SW12, coupled to the first signal-in end A and the second signal-in end B, can be selected to be closed (turned on) via the first signal-in end A and the second signal-in end B, respectively, which causes that any two of the inductive antennas T1-T12 form a physical antenna loop. The electromagnetic sensitive panel 21 also comprises a control unit 211 which is configured to control the switches SW1-SW12, coupled to the first signal-in end A and the second signal-in end B, to be closed in sequence by a pre-determined interval value to form various types of the physical antenna loops.

Specifically, to set the pre-determined interval value to 2, the control unit 211 controls input signals via the first signal-in end A and the second signal-in end B to turn on the switches SW1-SW12 in sequence, respectively, which forms the physical antenna loops as follows and the loop width of them is two: (T1, T3)、(T2, T4)、(T3, T5)、(T4, T6)、(T5, T7)、(T6, T8)、(T7, T9)、(T8, T10)、(T9, T11)、(T10, T12). Wherein, the pre-determined interval value can be changed dynamically. Therefore, various types of the physical antenna loops can be generated.

According to the above operation, by adjusting the loop width of the antenna loops, a global scan process is performed to detect whether the pointing device 23 approaches the region where the electromagnetic sensitive panel 21 can sense and detect the rough position of the pointing device 23.

Figure 4:
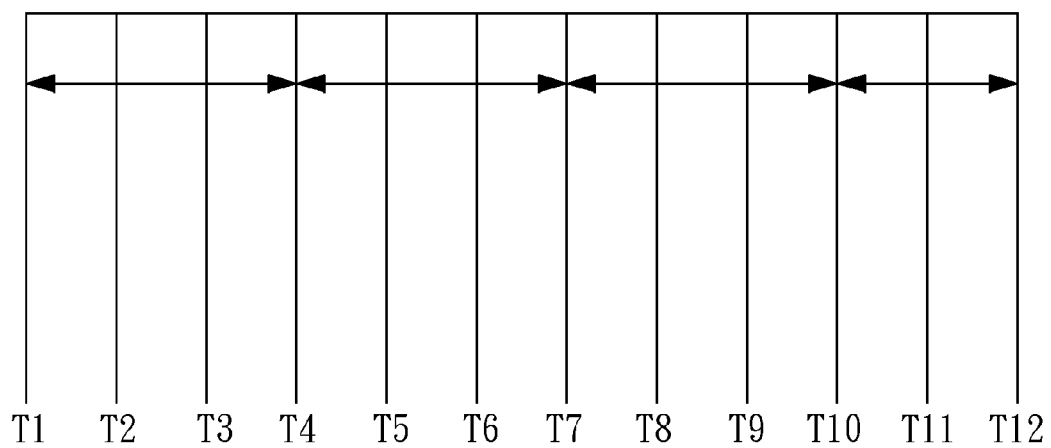
FIG. 4 shows a diagram illustrating a global scan according to one embodiment of the present invention.

Please refer to FIG. 4, which shows a diagram illustrating global scan according to one embodiment of the present invention. As shown in FIG. 4, take the pre-determined interval value is 3 as an example, the control unit 211 controls to input signals via the first signal-in end A and the second signal-in end B to turn on the switches SW1-SW12 in sequence, respectively, which forms each physical antenna loop at every three-loop widths. The physical antenna loops are formed by turning on the switches SW1-SW12 so that they do not overlap with each other. As long as the pointing device 23 approaches the region where the electromagnetic sensitive panel 21 can sense it, it can detect that the pointing device 23 is in which scope of the physical antenna loops (T1, T4)、(T4, T7)、(T7, T10)、(T10, T12) according to above global scan process operations. The pre-determined interval value can be increased to broaden the width of the physical antenna loops, which achieves the effect of global scanning quickly.

Figure 5A:
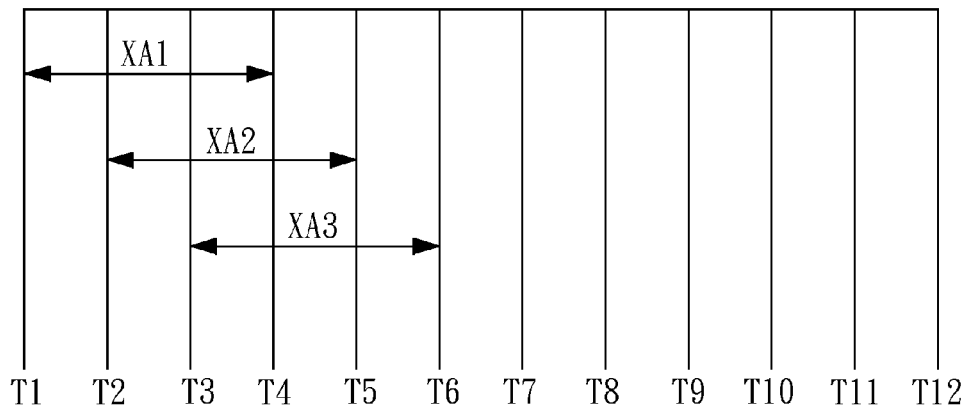
FIG. 5A shows a diagram illustrating a local scan according to one embodiment of the present invention.

A local scan process is performed by adjusting the loop width of the antenna loops dynamically to calculate the actually position of the pointing device 23. Please refer to FIG. 5A, which shows a diagram illustrating local scan according to one embodiment of the present invention. As shown in FIG. 5A, take the pre-determined interval value is 3 as example, the control unit 211 controls the input signals via the first signal-in end A and the second signal-in end B to turn on the switches SW1-SW12 in sequence, respectively, which forms each physical antenna loop at every three-loop widths. The physical antenna loops formed by turning on the switches SW1-SW12 so that adjacent loops are partially overlapped. If the pointing device 23 is in the region between the inductive antenna T2 and the inductive antenna T3, the signal values sensed by the physical antenna loops (T1, T4), (T2, T5), (T3, T6) are XA1, XA2, XA3, respectively. The control unit 211 can use the signal value XA2 sensed by the physical antenna loop (T2, T5) to calculate the coordinate value of the pointing device 23. In another embodiment, the control unit 211 can calculate the coordinate value of the pointing device 23 according to the signal value XA2 sensed by the physical antenna loop (T2, T5), where the pointing device 23 is in, and the signal values XA1, XA3 sensed by the around physical antenna loops (T1, T4), (T3, T6).

Figure 5B:
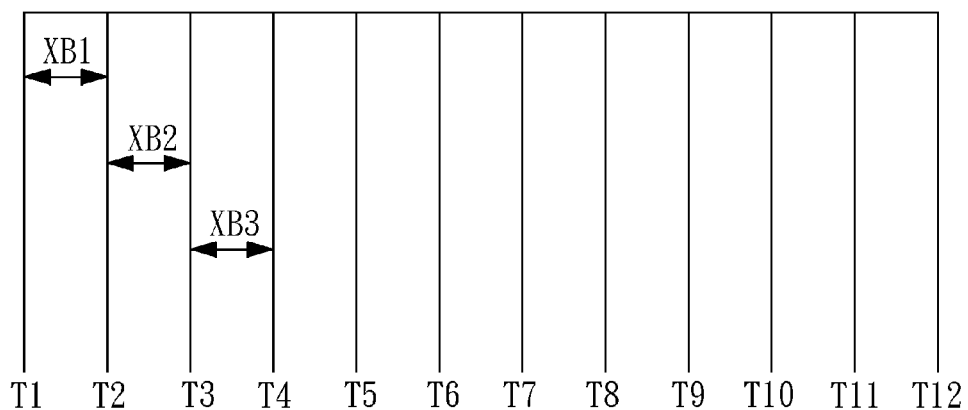
FIG. 5B shows a diagram illustrating a local scan according to another embodiment of the present invention.

Please refer to FIG. 5B, which shows a diagram illustrating local scan according to another embodiment of the present invention. As shown in FIG. 5B, take the pre-determined interval value is 1 as example, the control unit 211 controls to input signals via the first signal-in end A and the second signal-in end B to turn on the switches SW1-SW12 in sequence, respectively, which forms each physical antenna loop at every one-loop width. If the pointing device 23 is in the region between the inductive antenna T2 and the inductive antenna T3, the signal values sensed by the physical antenna loops (T1, T2), (T2, T3), (T3, T4) are XB1, XB2, XB3, respectively. The control unit 211 can use the signal value XB2 sensed by the physical antenna loop (T2, T3) to calculate the coordinate value of the pointing device 23. In another embodiment, the control unit 211 can calculate the coordinate value of the pointing device 23 according to the signal value XB2 sensed by the physical antenna loop (T2, T3), where the pointing device 23 is in, and the signal values XB1, XB3 sensed by the around physical antenna loops (T1, T2), (T3, T4).

In one embodiment, the control unit 211 uses different pre-determined interval values to form various types of physical antenna loops. The calculated coordinate values of the pointing device 23 in different pre-determined interval values are not all the same because of noise. The control unit 211 can select one of the calculated results to be the coordinate value of the pointing device 23, or can employ weighted coordinate values to calculate an actual coordinate value of the pointing device 23. For example, it calculates the coordinate values calculated in FIG. 5A and FIG. 5B to obtain the actually coordinate value of the pointing device 23.

Specifically, the control unit 211 may include, but is not limited to, a microcontroller unit, a microprocessor, or any other control circuit.

Figure 6:
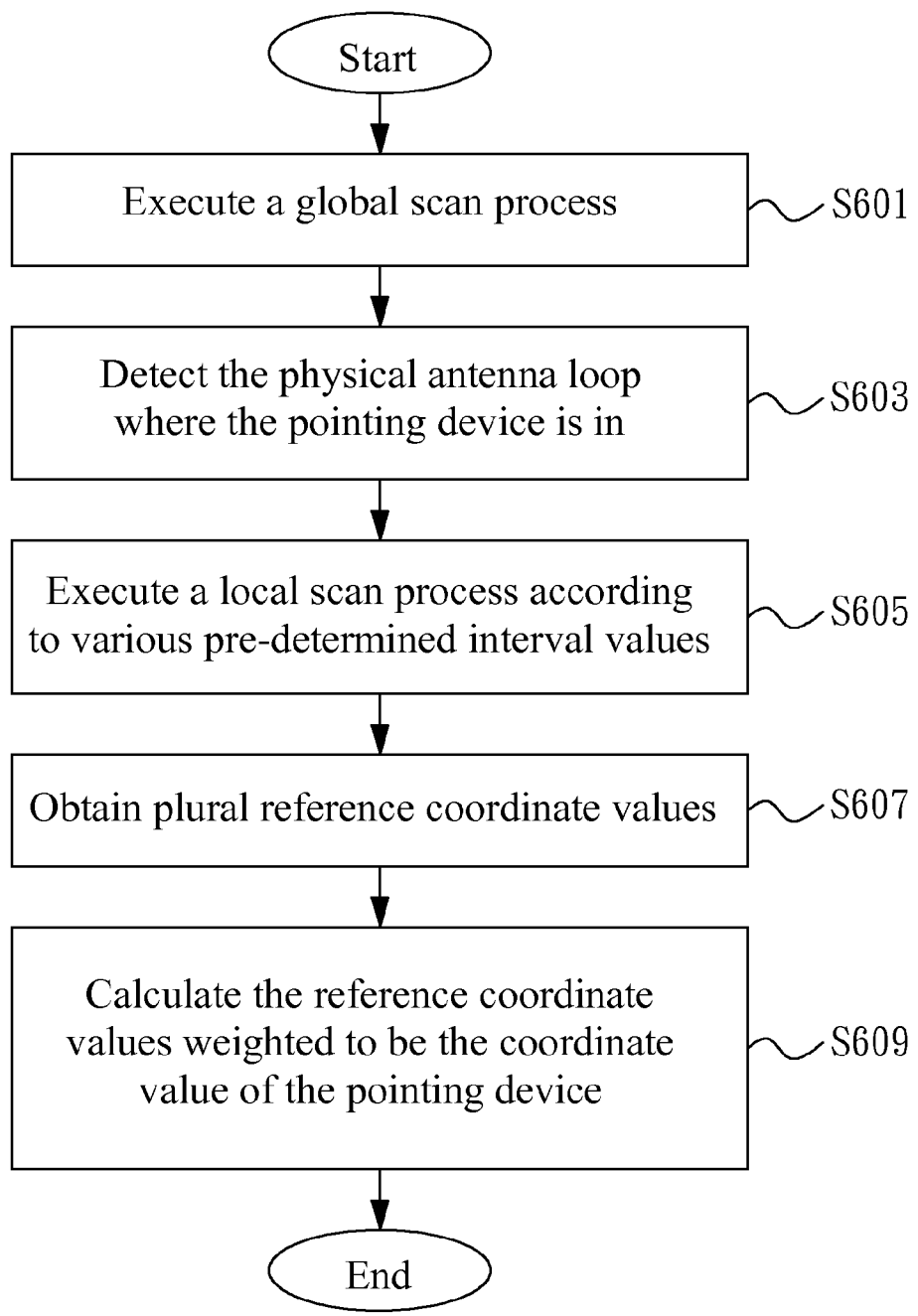
FIG. 6 shows a flow diagram illustrating an antenna loop layout method according to one embodiment of the present invention.

Finally, please refer to FIG. 6, which shows a flow diagram illustrating an antenna loop layout method according to one embodiment of the present invention. The method comprises the following steps:

First, a pre-determined interval value is pre-set in the electromagnetic sensitive panel 21, and the pre-determined interval value can be adjusted dynamically by the control unit 211. In step S601, the control unit 211 executes the global scan process, by turning on the switches SW1-SW12 in sequence according to the pre-determined interval value to detect whether the pointing device 23 approaches the region where the electromagnetic sensitive panel 21 can sense it and detect the rough position of the pointing device 23.

In step S603, the physical antenna loop where the pointing device is in is detected.

In step S605, the control unit 211 executes a local scan process according to various pre-determined interval values. For example, the local scan process may be performed according to a pre-determined interval value of 3 to calculate one reference coordinate value, and a local scan may be performed again according to a pre-determined interval value of 1 to calculate another reference coordinate value.

In step S607, multiple reference coordinate values are obtained.

Finally, in step S609 the control unit 211 employs a weighted calculation using the reference coordinate values according to different pre-determined interval values to determine the coordinate value of the pointing device 23.

According to the above embodiment, an electromagnetic sensor system and antenna loop layout method is provided whereby inductive antennas are arranged side by side and equidistant rather than being interlaced each other. The design less complex to manufacture and avoids the above noted increase in manufacturing error rate. Furthermore, the antenna loop layout in the present invention can be adjusted dynamically, and multiple coordinate values can be employed according to different pre-determined interval values to calculate the actually coordinate value of the pointing device 23. Consequently, the technique according to the present invention is less sensitive to noise.

Although specific embodiments have been illustrated and described, it will be appreciated by those skilled in the art that various modifications may be made without departing from the scope of the present invention, which is intended to be limited solely by the appended claims.

What is claimed is:

1. An electromagnetic sensor system, comprising:
   an electromagnetic sensitive panel, comprising:
      a plurality of inductive antennas disposed to be arranged side by side and equidistant, and one end of each inductive antenna is coupled with each other, and the other end of each inductive antenna comprises a switch;

a first signal-in end coupled with all of the switches;

a second signal-in end coupled with all of the switches; and a control unit configured to control the switches, coupled to the first signal-in end and the second signal-in end, to be closed in sequence by a pre-determined interval value to form a plurality of physical antenna loops;

wherein, the pre-determined interval value can be changed dynamically.

2. The electromagnetic sensor system of claim 1, further comprising a pointing device, wherein the control unit turns on the switches in sequence by the pre-determined interval value to detect the physical antenna loop where the pointing device is in.

3. The electromagnetic sensor system of claim 2, wherein the control unit turns on the switches in sequence by the pre-determined interval value to calculate a coordinate value of the pointing device according to the signal value sensed by the physical antenna loop where the pointing device is in.

4. The multi-antenna loop layout of claim 3, wherein the control unit calculates the coordinate value of the pointing device further according to the signal values sensed by the physical antenna loops which are around the physical antenna loop where the pointing device is in.

5. The electromagnetic sensor system of claim 4, wherein the control unit turns on the switches in sequence by plural and different pre-determined interval values, and wherein the control unit calculates a reference coordinate value of the pointing device according to the signal values sensed by the physical antenna loop where the pointing device is in and sensed by the physical antenna loops which are around the physical antenna loop where the pointing device is in according to each of the pre-determined interval values, and the control unit employs a weighted calculation using the reference coordinate values to determine the coordinate value.

6. The electromagnetic sensor system of claim 2, wherein the pointing device comprises an electromagnetic pen.

7. An antenna loop layout method for an electromagnetic sensor board, wherein the electromagnetic sensor board comprises a plurality of inductive antennas, and one end of each inductive antenna is coupled to each other, and the other end of each inductive antenna has a switch, and the method comprises:

providing a pre-determined interval value; and controlling the switches to be closed in sequence by the pre-determined interval value to form a plurality of physical antenna loops;

wherein, the pre-determined interval value can be changed dynamically.

8. The antenna loop layout method of claim 7, wherein the electromagnetic sensor board is used with a pointing device, and the step of controlling the switches to be closed in sequence comprises:

executing a global scan process, comprising:
 turning on the switches in sequence according to the pre-determined interval value, wherein the physical antenna loops formed by turning on the switches are not overlapped with each other; and
 detecting the physical antenna loop where the pointing device is in; and executing a local scan process, comprising:
 turning on the switches in sequence according to the pre-determined interval value, wherein the physical antenna loops formed by turning on the switches are partially overlapped; and
 calculating a coordinate value of the pointing device according to the signal value sensed by the physical antenna loop where the pointing device is in.

9. The antenna loop layout method of claim 8, wherein the coordinate value of the pointing device is calculated further according to the signal values sensed by the physical antenna loops which are around the physical antenna loop where the pointing device is in when executing the local scan process.

10. The antenna loop layout method of claim 9, wherein the step of executing the local scan process comprises turning on the switches in sequence by plural and different pre-determined interval values, wherein a reference coordinate value of the pointing device is calculated according to the signal values sensed by the physical antenna loop where the pointing device is in and sensed by the physical antenna loops which are around the physical antenna loop where the pointing device is in according to each pre-determined interval value, and employing a weighted calculation using the reference coordinate values to determine the coordinate value.

11. The antenna loop layout method of claim 7, wherein the pointing device comprises an electromagnetic pen.

* * * * *